US010934933B2

(12) United States Patent
Bruce et al.

(10) Patent No.: US 10,934,933 B2
(45) Date of Patent: Mar. 2, 2021

(54) FUEL GELLING PREVENTION USING ENGINE AUTO START FUNCTIONALITY

(71) Applicant: PACCAR Inc, Bellevue, WA (US)

(72) Inventors: David Bruce, Seattle, WA (US); Phu Vi Tran, Renton, WA (US); Brendan A. Smith, Bellevue, WA (US)

(73) Assignee: PACCAR INC, Bellevue, WA (US)

( * ) Notice: Subject to any disclaimer, the term of this patent is extended or adjusted under 35 U.S.C. 154(b) by 84 days.

(21) Appl. No.: 16/119,310

(22) Filed: Aug. 31, 2018

(65) Prior Publication Data

US 2020/0072123 A1 Mar. 5, 2020

(51) Int. Cl.
*F02M 37/22* (2019.01)
*F02B 77/08* (2006.01)
(Continued)

(52) U.S. Cl.
CPC ......... *F02B 77/089* (2013.01); *F02M 31/125* (2013.01); *F02M 31/16* (2013.01); *F02M 37/0052* (2013.01); *F02N 11/0803* (2013.01)

(58) Field of Classification Search
CPC .. F02D 41/062; F02D 41/065; F02D 19/0605; F02D 2200/0606; F02D 41/064; F02D 19/025; F02D 2200/06; F02D 41/26; F02M 2200/06; F02M 21/0293; F02M 31/16; F02M 37/0052; F02N 11/08; F23K 5/20
(Continued)

(56) References Cited

U.S. PATENT DOCUMENTS 4,411,240 A * 10/1983 Kravetz .................. F01P 11/20
123/142.5 E
4,680,110 A * 7/1987 Davis .................... F02M 37/24
210/114
(Continued)

FOREIGN PATENT DOCUMENTS

CN 207513718 U 6/2018
EP 1612397 A2 1/2006
(Continued)

OTHER PUBLICATIONS

European Extended Search Report in Application 19193859.6, dated Jan. 29, 2020, 8 pages.

*Primary Examiner* — George C Jin
*Assistant Examiner* — Teuta B Holbrook

(57) ABSTRACT

In some embodiments, a fuel temperature sensor is located proximate to a vehicle component that is expected to experience fuel gelling, such as near or within a fuel filter, in order to obtain temperature information that accurately reflects the likelihood of fuel gelling occurring within the component. The proximate fuel temperature sensor can provide more accurate temperature information for components such as fuel filters that are installed at the periphery of the vehicle, compared to other temperature sensors that measure oil temperatures or other temperatures of centrally located vehicle components. In some embodiments, the vehicle is automatically started when the temperature indicated by the fuel temperature sensor falls below a startup temperature threshold value, and is automatically stopped after a predetermined time period or after the temperature reaches a shutdown temperature threshold value.

15 Claims, 3 Drawing Sheets

(51) Int. Cl.

| | |
|---|---|
| ***F02M 31/125*** | (2006.01) |
| ***F02M 31/16*** | (2006.01) |
| ***F02M 37/00*** | (2006.01) |
| ***F02N 11/08*** | (2006.01) |

(58) Field of Classification Search
USPC .......................... 123/543, 549, 557; 210/184
See application file for complete search history.

(56) References Cited

U.S. PATENT DOCUMENTS 4,976,852 A * 12/1990 Janik ...................... B01D 17/00 210/86
5,197,443 A 3/1993 Hodgkins
5,443,053 A * 8/1995 Johnson ............... F02M 31/125 123/557
5,511,530 A * 4/1996 Buringrud ............... F16L 53/38 123/549
5,981,910 A 11/1999 Williams et al.
6,177,658 B1 1/2001 White et al.
6,270,659 B1 * 8/2001 Bagci ..................... B01D 29/15 210/111
7,091,629 B2 8/2006 Hawkins
7,665,557 B2 2/2010 Hughes et al.
8,480,884 B2 * 7/2013 Girondi .................. F02M 37/30 210/90
8,596,248 B2 12/2013 Eser et al.
9,222,699 B1 * 12/2015 Hendrickson ........ F02M 31/125
9,303,580 B2 4/2016 Fulton et al.
9,328,705 B2 5/2016 Kue et al.
9,879,641 B2 * 1/2018 Ham ....................... F02D 41/22
2003/0116490 A1 * 6/2003 Keyster .................. B01D 35/18 210/184
2006/0023480 A1 * 2/2006 Plummer ........... B60H 1/00278 363/146
2007/0093954 A1 * 4/2007 Malone ................... F02D 41/22 701/112
2010/0133193 A1 * 6/2010 Zulauf ................. C10G 25/003 210/660
2010/0139627 A1 * 6/2010 Verhein ............... F02D 19/0605 123/553
2011/0011372 A1 * 1/2011 Sturgess ................. F02M 37/22 123/495
2014/0229091 A1 * 8/2014 Larsson .............. F02N 11/0833 701/113
2015/0167606 A1 * 6/2015 Park ..................... B01D 35/005 210/742
2017/0175657 A1 * 6/2017 Fei ........................ F02D 41/064
2017/0254299 A1 * 9/2017 Smith .................. F02M 31/125
2018/0038323 A1 * 2/2018 Huang ................... F02M 27/08
2018/0156097 A1 * 6/2018 Suzuki .................... F01N 3/029
2018/0274432 A1 * 9/2018 Smith ................... F02D 41/064
2019/0301329 A1 * 10/2019 Zink ..................... F02D 41/029

FOREIGN PATENT DOCUMENTS

EP 2767702 A1 8/2014
JP 2015202832 A * 11/2015 ............. B60K 6/445
KR 20020030333 A * 4/2002
KR 20130013176 A 2/2013

* cited by examiner

FUEL GELLING PREVENTION USING ENGINE AUTO START FUNCTIONALITY

BACKGROUND

Manufacturers and operators of vehicles are constantly seeking to improve the fuel efficiency of their vehicles. In particular commercial vehicle operators of long haul trucks, construction equipment vehicles, delivery vehicles, and the like would be able to reduce operating costs by reducing fuel costs with improved operating efficiency. Improvements in fuel efficiency will also reduce vehicle emissions, and may provide other environmental benefits.

One strategy for improving fuel efficiency is to reduce vehicle idle time. During normal operations, vehicles experience periods in which the vehicle is not moving, but the engine is idling, for example when stopped in traffic. Sometimes an operator will allow the engine to idle during loading/unloading stops or rest stops if the weather is sufficiently cold that there are concerns regarding restarting the engine, and in particular to avoid fuel gelling from plugging the fuel filter.

The viscosity of diesel fuel increases with decreasing temperature. When the diesel fuel temperature drops below a temperature referred to as the "cold filter plug point" ("CFPP"), the diesel fuel will begin to wax or gel sufficiently to cause filter plugging. CFPP is typically experimentally determined and is the estimated highest temperature at which a particular fuel will cause fuel filter plugging. Depending on the particular diesel fuel (e.g., No. 2 diesel, No. 1 diesel, B20 biodiesel, etc.), the CFPP may vary from −10° F. to 15° F. (−23° C. to −9° C.).

Gelling of the fuel filter will typically require the operator to obtain and install a new fuel filter, which can result in significant down time for the operator. Running the vehicle's engine is an effective method of preventing fuel gel. Diesel engine systems generate large amounts of power and, are configured to use this power in a variety of ways to heat the fuel and avoid fuel gelling. Therefore, engine idle is an effective method to prevent fuel filter plugging, but it is costly to the operator.

In order to reduce vehicle idle time, various systems and methods have been developed to automatically (1) stop the engine when the vehicle is stationary and certain operating conditions are met and (2) restart the engine based on operator input and/or other operating conditions. By reducing the time during which the vehicle engine operates unnecessarily, fuel consumption is reduced, and vehicle fuel efficiency is increased.

Existing cold weather protection systems monitor engine temperatures such as engine coolant temperature or engine oil temperature, to selectively start the engine. These engine temperatures (engine coolant and engine oil) are critical inputs for protecting the engine itself from getting critically cold. However, they do not take into account one of the primary modes of cold weather engine failure: fuel filter clogging. Temperatures near the engine are typically not representative of the temperature of fuel directly upstream of or within the fuel filter, which may be mounted on the vehicle frame outside of an engine compartment, or of fuel reserves located further aft on the vehicle frame.

It would be beneficial to provide an automatic starting and stopping system that protects the vehicle from fuel filter clogging due to fuel gelling in cold weather, while also improving the fuel efficiency of the vehicle by reducing the engine idle time.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a vehicle is provided. The vehicle comprises an internal combustion engine, a fuel filter coupled to the internal combustion engine, and a fuel temperature sensor. The fuel temperature sensor is configured to measure a temperature of fuel near the fuel filter.

In some embodiments, a method of controlling fuel temperature in a diesel-powered vehicle is provided. An electronic control unit (ECU) of the vehicle receives fuel temperature information from a fuel temperature sensor situated to detect a fuel temperature associated with a fuel filter of the vehicle. In response to determining that a fuel temperature indicated by the fuel temperature information is below a startup temperature threshold value, the ECU transmits an instruction to an engine crank to start an internal combustion engine of the vehicle.

In some embodiments, a non-transitory computer-readable medium is provided. The computer-readable medium has computer-executable instructions stored thereon that, in response to execution by an electronic control unit (ECU) of a vehicle, cause the vehicle to perform actions for controlling fuel temperature in the vehicle. The actions comprise receiving, by the ECU, fuel temperature information from a fuel temperature sensor situated to detect a fuel temperature near a fuel filter of the vehicle; and, in response to determining that a fuel temperature indicated by the fuel temperature information is below a startup temperature threshold value, transmitting, by the ECU, an instruction to an engine crank to start an internal combustion engine of the vehicle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments, an internal combustion engine of a vehicle that is not running and is in a cold weather environment is automatically started in order to warm the fuel and thereby avoid fuel gelling. In some embodiments, a fuel temperature sensor is located proximate to a vehicle component that is expected to experience fuel gelling, such as near or within a fuel filter, in order to obtain temperature information that accurately reflects the likelihood of fuel gelling occurring within the component. The proximate fuel temperature sensor can provide more accurate temperature information for components such as fuel filters that are installed at the periphery of the vehicle, compared to other temperature sensors that measure oil temperatures or other temperatures of centrally located vehicle components. In some embodiments, the vehicle is automatically started when the temperature indicated by the fuel temperature sensor falls below a startup temperature threshold value, and is automatically stopped after a predetermined time period or after the temperature reaches a shutdown temperature threshold value.

Figure 1:
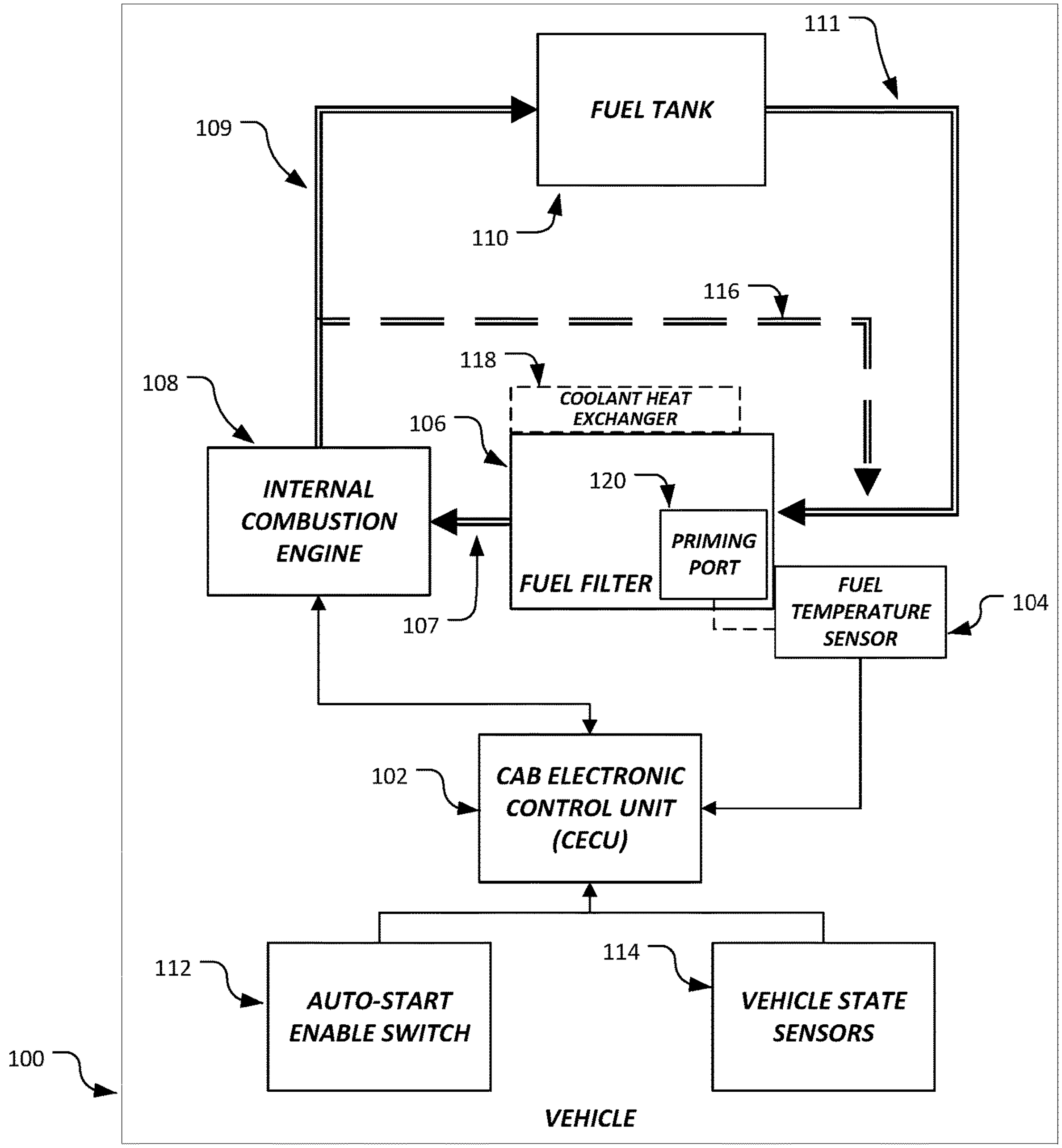
FIG. 1 is a block diagram that illustrates an example embodiment of a vehicle according to various aspects of the present disclosure.

FIG. 1 is a block diagram that illustrates an example embodiment of a vehicle according to various aspects of the present disclosure. As illustrated, the vehicle 100 includes a cab electronic control unit (CECU) 102, a fuel temperature sensor 104, a fuel filter 106, an internal combustion engine 108, a fuel tank 110, an auto-start enable switch 112, and a set of vehicle state sensors 114.

The internal combustion engine 108 may be any type of engine that combusts fuel in order to generate torque. Typically, the internal combustion engine 108 may utilize diesel fuel, though in some embodiments, other types of fuel may be used. Fuel for the internal combustion engine 108 is stored in the fuel tank 110. Though a single fuel tank is illustrated, in some embodiments, more than one fuel tank may be present in the vehicle 100. A fuel filter 106 is present to ensure that particulates, water, and other unwanted material do not pass from the fuel tank 110 to the internal combustion engine 108. In some embodiments, the fuel filter 106 is connected to the internal combustion engine 108 via a filtered supply fuel line 107.

Fuel is provided to the internal combustion engine 108 from the fuel tank 110 via a fuel line, which may include a supply fuel line 111 that provides the fuel to the internal combustion engine 108 via the fuel filter 106. Excess fuel that is not used by the internal combustion engine 108 is returned to the fuel tank 110 via a return fuel line 109. The unused fuel has been warmed up by the internal combustion engine 108, and so one side effect of returning the unused fuel to the fuel tank 110 is that the fuel remaining in the fuel tank 110 is warmed up by the unused fuel. This helps to prevent fuel gelling within the fuel tank 110 in cold weather conditions. Because the fuel in the fuel tank 110 is warmed by this process, it may also help to prevent fuel gelling in other portions of the vehicle 100, such as in the supply fuel line 111 and the fuel filter 106.

Though return fuel warming of fuel in the fuel tank 110 does eventually heat the fuel filter 106 by heating all of the fuel in the system, in some embodiments, one or more additional components may be present in order to heat the fuel filter 106. In some embodiments, a return fuel blender line 116 may be configured to return unused fuel from the internal combustion engine 108 directly to the fuel filter 106 to more directly heat the contents of the fuel filter 106. In some embodiments, an electric heater (not illustrated) may be incorporated into the design of the vehicle 100 to warm the fuel filter 106. In some embodiments, a coolant heat exchanger 118 may be incorporated into the design of the vehicle 100 to circulate engine coolant that has been heated by the internal combustion engine 108 to warm the fuel filter 106. In some embodiments, these heating techniques are only active when the internal combustion engine 108 is running.

The fuel temperature sensor 104 is arranged in such a manner that it is able to determine temperature information that represents a temperature of the fuel within the fuel line 111 at a location close to the fuel filter 106. While some temperature sensors may determine a temperature of fuel close to or within the internal combustion engine 108 or within the fuel tank 110, this temperature information is inadequate to determine whether fuel gelling may occur within the fuel filter 106, which is often situated relatively far from the fuel tank 110 and the internal combustion engine 108. Accordingly, arranging the fuel temperature sensor 104 proximate to the fuel filter 106 results in temperature information that is more useful in preventing fuel gelling within the fuel filter 106. In some embodiments, the fuel temperature sensor 104 may be placed at any point within the fuel system where fuel gelling may occur, and where other fuel temperature sensors may not provide information useful enough to avoid fuel gelling at that point.

In some embodiments, the fuel temperature sensor 104 is an in-line sensor that is coupled at a point within the supply fuel line 111. For example, the fuel temperature sensor 104 may serve as a coupling device between the supply fuel line 111 and the fuel filter 106. In some embodiments, the fuel temperature sensor 104 may be placed to sense a temperature of fuel within the fuel filter 106. For example, in some embodiments, the fuel temperature sensor 104 may be coupled to a priming port 120 of the fuel filter 106. Such embodiments may be particularly useful in that the fuel filter 106 and/or a molded supply fuel line 111 need not be redesigned to accommodate the fuel temperature sensor 104. As another example, in some embodiments, the fuel filter 106 may be designed to include a dedicated port that accepts the fuel temperature sensor 104 and positions it to sense the temperature of the fuel within the fuel filter 106.

In some embodiments, the auto-start enable switch 112 is a physical switch within a cab of the vehicle 100 that allows an operator to specify whether the auto-start functionality described below should be enabled. In some embodiments, the auto-start enable switch 112 may be one or more switches that have a momentary position that enables the auto-start functionality, and a toggle switch that disables the auto-start functionality. In some embodiments, the enabling and disabling features are integrated into a single three-position switch, wherein the three positions are a momentary enable position, a neutral position, and a toggle disable position.

In some embodiments, the vehicle state sensors 114 include one or more sensors coupled to various components of the vehicle 100 that generate information about the state of the components of the vehicle, including but not limited to whether various indicator lamps are on, switch positions, and active/inactive states of vehicle components. Further description of information generated by the vehicle state sensors 114 is provided below.

In some embodiments, the CECU 102 is a computing device that is configured to receive information from the auto-start enable switch 112, the vehicle state sensors 114, the internal combustion engine 108, and the fuel temperature sensor 104, to process the information, and to send commands or other information to the internal combustion engine 108. In some embodiments, the CECU 102 may include one or more memory devices including but not limited to a random access memory ("RAM") and an electronically erasable programmable read-only memory ("EEPROM"), and one or more processors.

The various components illustrated in FIG. 1 such as the CECU 102, the fuel temperature sensor 104, the internal combustion engine 108, the auto-start enable switch 112, and the vehicle state sensors 114, may communicate with each other through a vehicle-wide communications network. Those skilled in the art and others will recognize that the vehicle-wide communications network may be implemented using any number of different communication protocols such as, but not limited to, Society of Automotive Engineers' ("SAE") J1587, SAE J1922, SAE J1939, SAE J1708, and combinations thereof. In some embodiments, other wired or wireless communication technologies, such as WiFi, Ethernet, Bluetooth, or other technologies may be used to connect at least some of the components to the vehicle-wide communications network.

Figure 2A:
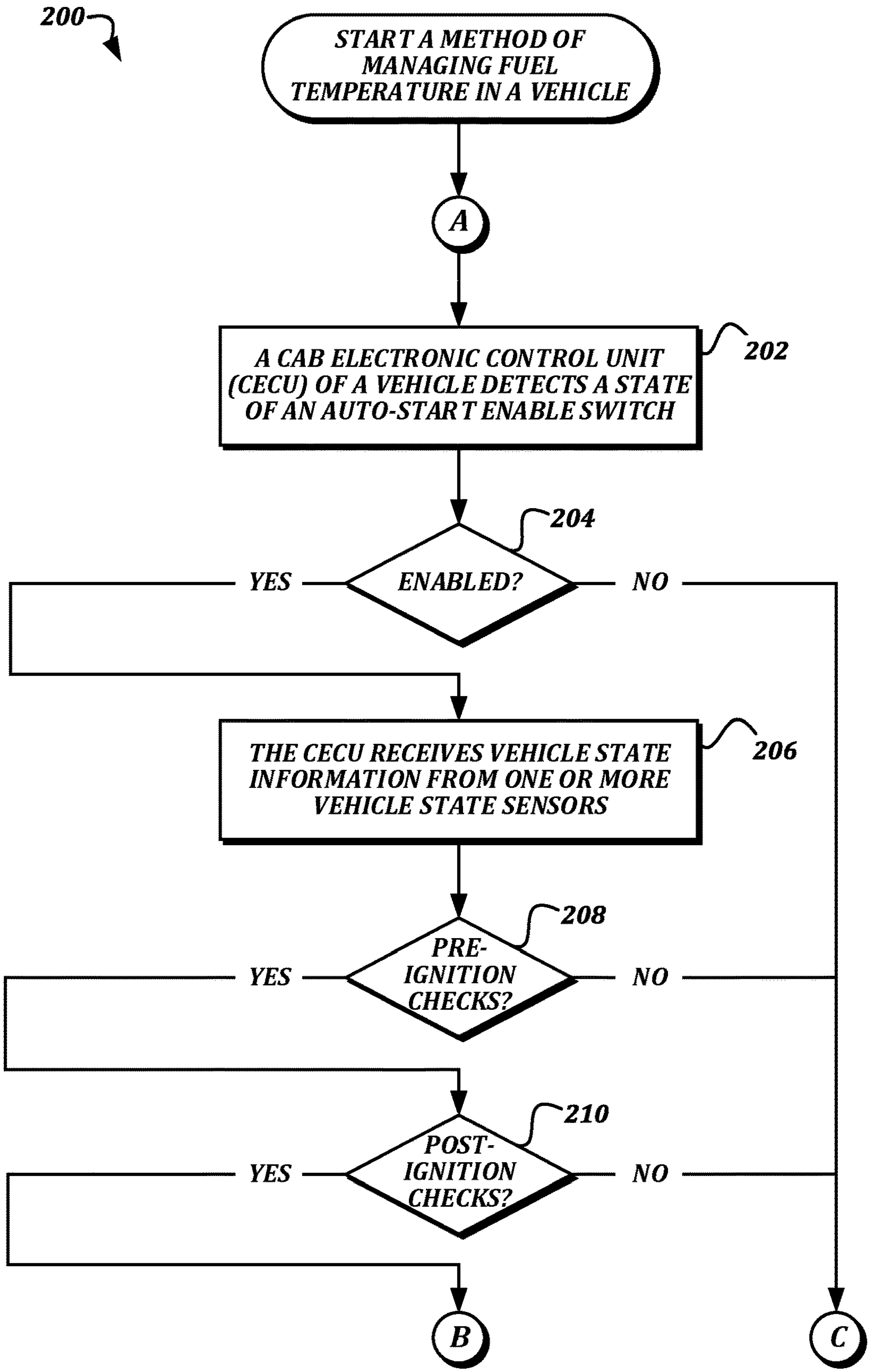
FIGS. 2A-2B are a flowchart that illustrates an example embodiment of a method of managing fuel temperature in a vehicle according to various aspects of the present disclosure.
Figure 2B:
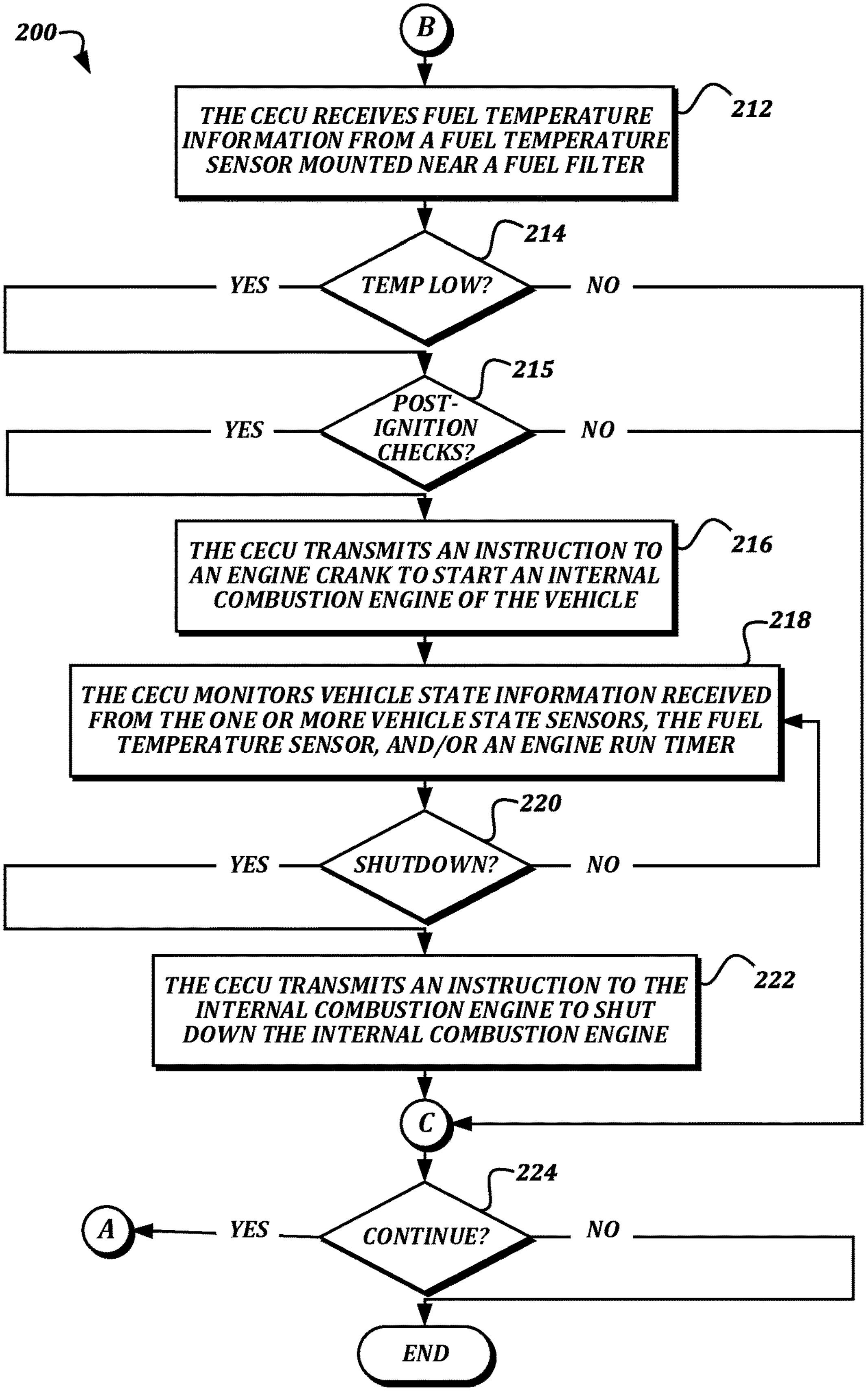

FIGS. 2A-2B are a flowchart that illustrates an example embodiment of a method of managing fuel temperature in a vehicle according to various aspects of the present disclosure. From a start block, the method proceeds through a continuation terminal ("terminal A") to block 202, where a cab electronic control unit (CECU) 102 of a vehicle 100 detects a state of an auto-start enable switch 112. In some embodiments, the auto-start enable switch 112 is a three-position switch that has a momentary "enable" position, a neutral position, and a toggle "disable" position. Accordingly, in some embodiments, block 202 may be entered by virtue of detecting that the auto-start enable switch 112 has been placed in the momentary "enable" position. In some embodiments, the determination in block 202 may be based on whether the auto-start enable switch 112 is either in the neutral or disable position, or instead has been placed in the enable position at some point since the last time the it was placed in the disable position. In some embodiments, the auto-start enable switch 112 may be a two-state toggle switch, and the state may be either enabled or disabled.

At decision block 204, a determination is made regarding whether the auto-start functionality is enabled based on the state of the auto-start enable switch 112. If it is determined that the auto-start functionality is not enabled based on the state of the auto-start enable switch 112 (or a past state of the auto-start enable switch 112) as described above, then the result of decision block 204 is NO, and the method 200 proceeds to another continuation terminal ("terminal C"). Otherwise, if it is determined that the auto-start functionality is enabled, then the result of decision block 204 is YES, and the method 200 proceeds to block 206.

At block 206, the CECU 102 receives vehicle state information from one or more vehicle state sensors 114. The vehicle state sensors 114 are configured to determine states of various vehicle components or of the environment surrounding the vehicle, and to provide the vehicle state information to the CECU 102 via the vehicle network. The states of the various vehicle components may include, but are not limited to, the states of various switches, the states of various indicator lamps, the states of various vehicle components such as transmission components or doors, various states of the internal combustion engine 108 such as an engine speed, and states of various levels such as a fuel level, an oil level, and a battery state of charge.

At decision block 208, a determination is made regarding one or more pre-ignition interlock checks. The pre-ignition interlock checks are based on the vehicle state information received from the vehicle state sensors 114, and may include one or more of determining whether all vehicle doors are closed, determining whether a key ignition switch is on, determining whether a park brake switch is active, determining whether a hood switch is closed and not failed, determining whether a service brake switch is active, and determining whether a clutch switch is active. These pre-ignition interlock checks are examples only, and in some embodiments, other pre-ignition interlock checks may be used.

If it is determined that the pre-ignition checks have failed, then the result of decision block 208 is NO, and the method 200 proceeds to terminal C. In some embodiments, if any one of the pre-ignition checks fails, the result of decision block 208 is NO. In some embodiments, one or more non-critical pre-ignition checks may be allowed to fail without causing the result of decision block 208 to be NO, and instead the result may be YES and a warning or other alert may be presented to an operator.

If the pre-ignition checks have passed, then the result of decision block 208 is YES, and the method 200 proceeds to decision block 210. At decision block 210, the ignition of the vehicle 100 is turned on, and a determination is made regarding one or more post-ignition interlock checks. The post-ignition interlock checks are also based on the vehicle state information received from the vehicle state sensors 114, and may include one or more of determining whether the transmission is in neutral, determining whether a stop engine lamp is on, determining whether a check engine lamp is on, determining whether an engine malfunction indicator lamp is on, determining whether an engine protection indicator lamp is on, determining whether an engine diesel particulate filter (DPF) lamp is on, determining whether an engine high exhaust system temperature (HEST) lamp is on, determining whether an engine power take off (PTO) is engaged, determining whether the auto-start enable switch 112 is stuck on, determining whether an anti-theft system is locked, determining whether an error is detected in engine speed communication, determining whether an error is detected in an auto transmission communication, determining whether a maximum engine run time has been reached, determining whether overcranking is detected, and determining that the engine is running and an unexpected shutdown is detected. These post-ignition interlock checks are examples only, and in some embodiments, other post-ignition interlock checks may be used. After the post-ignition checks are executed in block 210, the ignition is turned back off to save power.

If it is determined that the post-ignition checks have failed, then the result of decision block 210 is NO, and the method 200 proceeds to terminal C. In some embodiments, if any one of the post-ignition checks fails, the result of decision block 210 is NO. In some embodiments, one or more non-critical post-ignition checks may be allowed to fail without causing the result of decision block 210 to be NO, and instead the result may be YES and a warning or other alert may be presented to an operator.

If the post-ignition checks have passed, then the result of decision block 210 is YES, and the method 200 proceeds to another continuation terminal ("terminal B"). From terminal B (FIG. 2B), the method 200 proceeds to block 212, where the CECU 102 receives fuel temperature information from a fuel temperature sensor 104 mounted near a fuel filter 106. As illustrated and described above, the fuel temperature sensor 104 is located proximate to the fuel filter 106, such as on a portion of a fuel line 111 that is proximate to the fuel filter 106, within a coupling device that attaches the fuel line 111 to the fuel filter 106, or attached to the fuel filter 106 itself such as to a priming port or a dedicated port.

In some embodiments, the fuel temperature information received from the fuel temperature sensor 104 may be a value that represents resistance, which may then be converted by the CECU 102 to a temperature value. In some embodiments, the fuel temperature information received from the fuel temperature sensor 104 may be converted to a temperature value instead of a resistance value by the fuel temperature sensor 104 itself, and the temperature value itself may be provided to the CECU 102.

The method 200 then proceeds to decision block 214, where a determination is made regarding whether a fuel temperature indicated by the fuel temperature information is below a startup temperature threshold value. In some embodiments, the startup temperature threshold value may be determined based on a temperature at which fuel gelling is expected to occur. For example, the startup temperature threshold value may be set to −18° C. (0° F.), based on an average CFPP. In some embodiments, the startup temperature threshold value may be configured by the operator based on gelling characteristics of a particular fuel blend being used in the vehicle 100. Though decision block 214 is described as determining whether the fuel temperature is "below" the startup temperature threshold value, some embodiments may determine whether the fuel temperature is "at or below" the startup temperature threshold value.

If it is determined that the fuel temperature is not below the startup temperature threshold value, then the result of decision block 214 is NO, and the method 200 proceeds to terminal C. Otherwise, if it is determined that the fuel temperature is below the startup temperature threshold value, then the result of decision block 214 is YES, and the method 200 proceeds to decision block 215, where the ignition is turned on and a determination is made based on one or more post-ignition interlock checks. The determination based on the post-ignition interlock checks is similar to the determination made in decision block 210, and so is not described again here for the sake of brevity. If the post-ignition interlock checks indicate a failure, then the result of decision block 215 is NO, the ignition is turned off, and the method 200 proceeds to terminal C.

Otherwise, if the post-ignition interlock checks do not indicate a failure, the method 200 proceeds to block 216, where the CECU 102 transmits an instruction to an engine crank to start an internal combustion engine 108 of the vehicle 100. In some embodiments, the instruction is transmitted to the engine crank as a digital command via the vehicle network. In some embodiments, the CECU 102 may transmit a startup instruction or a torque request to an engine control unit, and the engine control unit may in turn transmit the instruction to the engine crank or other device for starting the internal combustion engine 108. Once the engine crank has started the internal combustion engine 108, the engine crank stops, and the internal combustion engine 108 continues to run normally.

Next, at block 218, the CECU 102 monitors vehicle state information received from the one or more vehicle state sensors 114, the fuel temperature sensor 104, and/or an engine run timer. In some embodiments, the engine run timer measures an amount of time for which the internal combustion engine 108 has been running since being started at block 216. At decision block 220, a determination is made regarding whether the internal combustion engine 108 should be shut down. In some embodiments, the determination may be based at least in part on whether the engine run timer indicates that the internal combustion engine 108 has been running for a predetermined amount of time, such as thirty minutes. In some embodiments, this predetermined amount of time may be some other amount of time, and/or may be configurable by the operator. In some embodiments, the determination of whether the internal combustion engine 108 should be shut down may be based on the monitoring information gathered in block 218. For example, the determination may be based on whether any of the pre-ignition interlocks or post-ignition interlocks have failed since the previous check. As another example, the determination may be based on whether the fuel temperature is greater than or equal to a shutdown temperature threshold value. The shutdown temperature threshold value may be determined based on an offset from the startup temperature threshold value, such as five or ten degrees above the startup temperature threshold value. In some embodiments, some combination of these bases for the determination may be used.

Some benefits can be achieved by using the engine run timer to determine when to shut down the internal combustion engine 108. For example, while the CECU 102 may be programmed once for a given truck model or a given fleet, individual trucks of that model or fleet may have different hardware configurations, such as different locations of fuel temperature sensors 104, different components for heating the fuel filter 106, and so on. Accordingly, the most reliable way to ensure that the fuel filter 106 is heated adequately in spite of not knowing the exact configuration of the vehicle 100 is to run the internal combustion engine 108 for an adequate amount of time to heat the fuel in the fuel tank 110.

If it is determined that the internal combustion engine 108 should not be shut down, then the result of decision block 220 is NO, and the method 200 returns to block 218 for further monitoring. Otherwise, if it is determined that the internal combustion engine 108 should be shut down, then the result of decision block 220 is YES, and the method 200 proceeds to block 222. At block 222, the CECU 102 transmits an instruction to the internal combustion engine 108 to shut down the internal combustion engine 108. In some embodiments, the instruction may be a digital command transmitted by the CECU 102 to an engine control unit, a fuel control module, or any other suitable component of the vehicle 100 via the vehicle network. The instruction may be any type of command that causes the internal combustion engine 108 to shut down, including but not limited to a specific shutdown command or a torque request for zero torque. The CECU 102 may also turn off the ignition, if it is on.

The method 200 then proceeds to terminal C, and then to an end block where it terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A vehicle, comprising:
- an internal combustion engine;
- a fuel filter coupled to the internal combustion engine, wherein the fuel filter comprises a priming port;
- a fuel temperature sensor configured to measure a temperature of fuel within the fuel filter, wherein the fuel temperature sensor is coupled to the priming port of the fuel filter;
- a vehicle state sensor; and
- an electronic control unit (ECU) configured to:
- receive fuel temperature information from the fuel temperature sensor;
- receive vehicle state information from the vehicle state sensor;
- perform, based on the vehicle state information, a post-ignition interlock check;
- based on determining that the post-ignition interlock check has failed, transmit an instruction to the internal combustion engine to shut down.

2. The vehicle of claim 1, further comprising at least one of:
- a return fuel line configured to provide heated return fuel from the internal combustion engine to the fuel tank;
- a return fuel blender line configured to provide heated return fuel from the internal combustion engine to the fuel filter; and a coolant heat exchanger configured to warm the fuel filter using engine coolant.

3. The vehicle of claim 1, wherein the (ECU) is further configured to:

in response to determining that the internal combustion engine has been running for a predetermined amount of time, transmit an instruction to the internal combustion engine to shut down.

4. The vehicle of claim 1, wherein the (ECU) is further configured to:

continue to receive fuel temperature information from the fuel temperature sensor while the internal combustion engine is running; and in response to determining that the fuel temperature indicated by the fuel temperature information is above a shutdown temperature threshold value, transmit an instruction to the internal combustion engine to shut down.

5. The vehicle of claim 1, wherein the vehicle is a Class 8 truck.

6. The vehicle of claim 1, further comprising a return fuel blender line configured to provide heated return fuel from the internal combustion engine to the fuel filter.

7. A method of controlling fuel temperature in a diesel-powered vehicle, the method comprising:

receiving, by an electronic control unit (ECU) of the vehicle, fuel temperature information from a fuel temperature sensor coupled to a priming port of a fuel filter of the vehicle and situated to detect a fuel temperature within the fuel filter of the vehicle;

in response to determining that a fuel temperature indicated by the fuel temperature information is below a startup temperature threshold value, transmitting, by the ECU, an instruction to an engine crank to start an internal combustion engine of the vehicle;

receiving vehicle state information from a vehicle state sensor;

performing, based on the vehicle state information, a post-ignition interlock check; and based on determining that the post-ignition interlock check has failed, transmitting, by the ECU, an instruction to the internal combustion engine to shut down.

8. The method of claim 7, further comprising:

in response to determining that the internal combustion engine has been running for a predetermined amount of time, transmitting, by the ECU, an instruction to the internal combustion engine to shut down.

9. The method of claim 7, further comprising:

continuing to receive, by the ECU, fuel temperature information from the fuel temperature sensor while the internal combustion engine is running; and in response to determining that the fuel temperature indicated by the fuel temperature information is above a shutdown temperature threshold value, transmitting, by the ECU, an instruction to the internal combustion engine to shut down.

10. The method of claim 7, wherein the priming port is configured to accept the fuel temperature sensor.

11. The method of claim 7, wherein the post-ignition interlock check comprises determining whether an engine-malfunction indicator has been activated.

12. A non-transitory computer-readable medium having computer-executable instructions stored thereon that, in response to execution by an electronic control unit (ECU) of a vehicle, cause the vehicle to perform actions for controlling fuel temperature in the vehicle, the actions comprising:

receiving, by the ECU, fuel temperature information from a fuel temperature sensor coupled to a priming port of a fuel filter of the vehicle and situated to detect a fuel temperature within the fuel filter of the vehicle;

in response to determining that a fuel temperature indicated by the fuel temperature information is below a startup temperature threshold value, transmitting, by the ECU, an instruction to an engine crank to start an internal combustion engine of the vehicle;

receiving, by the ECU, vehicle state information from a vehicle state sensor;

performing, based on the vehicle state information, a post-ignition interlock check; and based on determining that the post-ignition interlock check has failed, transmitting, by the ECU, an instruction to the internal combustion engine to shut down.

13. The computer-readable medium of claim 12, wherein the actions further comprise:

in response to determining that the internal combustion engine has been running for a predetermined amount of time, transmitting, by the ECU, an instruction to the internal combustion engine to shut down.

14. The computer-readable medium of claim 12, further comprising:

continuing to receive, by the ECU, fuel temperature information from the fuel temperature sensor while the internal combustion engine is running; and in response to determining that the fuel temperature indicated by the fuel temperature information is above a shutdown temperature threshold value, transmitting, by the ECU, an instruction to the internal combustion engine to shut down.

15. The computer-readable medium of claim 14, wherein the shutdown temperature threshold value is greater than the startup temperature threshold value.

* * * * *